(12) United States Patent
Krishnamoorthy et al.

(10) Patent No.: US 8,223,777 B2
(45) Date of Patent: Jul. 17, 2012

(54) GATEWAY FOR ACHIEVING LOW LATENCY AND HIGH AVAILABILITY IN A REAL TIME EVENT PROCESSING SYSTEM

(75) Inventors: Jayaprakash Krishnamoorthy, Santa Clara, CA (US); Jerome Guionnet, Palo Alto, CA (US); Alexander Rockel, Hamburg (DE)

(73) Assignee: Oracle International Corporation, Redwood Shores, CA (US)

( * ) Notice: Subject to any disclaimer, the term of this patent is extended or adjusted under 35 U.S.C. 154(b) by 808 days.

(21) Appl. No.: 11/559,969

(22) Filed: Nov. 15, 2006

(65) Prior Publication Data

US 2007/0110083 A1  May 17, 2007

Related U.S. Application Data

(60) Provisional application No. 60/737,429, filed on Nov. 15, 2005.

(51) Int. Cl.
*H04L 12/28* (2006.01)
*H04L 12/56* (2006.01)

(52) U.S. Cl. ....................................... 370/401

(58) Field of Classification Search ................ 370/352, 370/401, 466; 705/2
See application file for complete search history.

(56) References Cited

U.S. PATENT DOCUMENTS

| | | |
|---|---|---|
| 4,430,530 A | 2/1984 | Kandell et al. |
| 4,831,582 A | 5/1989 | Miller et al. |
| 4,849,884 A | 7/1989 | Axelrod et al. |
| 4,868,743 A | 9/1989 | Nishio |
| 4,918,593 A | 4/1990 | Huber |
| 4,968,873 A | 11/1990 | Dethloff et al. |
| 5,006,978 A | 4/1991 | Neches |
| 5,010,485 A | 4/1991 | Bigari |
| 5,036,389 A | 7/1991 | Morales |

(Continued)

FOREIGN PATENT DOCUMENTS

EP  063402 A1  10/1982

(Continued)

OTHER PUBLICATIONS

Black, "Real-Time Fraud Management" Billing World, Jul./Aug. 1999; pp. 3. Notice of Allowance for U.S. Appl. No. 09/562,875 mailed on May 21, 2007; pp. 7.
Final Office Action for U.S. Appl. No. 09/562,875 mailed on Jan. 11, 2007; pp. 17.

(Continued)

*Primary Examiner* — Chirag Shah
*Assistant Examiner* — Minh-Trang Nguyen
(74) *Attorney, Agent, or Firm* — Kilpatrick, Townsend & Stockton LLP

(57) ABSTRACT

Methods, machine-readable media, and apparatuses are disclosed for interfacing computer networks. According to one embodiment, a method for interfacing a first network using a first protocol with a second network using a second protocol can comprise receiving an event in the form of a first message from the first network, where the first message is encoded using the first protocol. The first message can be translated into a second message, where the second message is encoded using the second protocol. The second message can be transmitted to the second network. If a response is not received from the second network within a configurable interval, the event can be processed based upon at least one rule that is responsive to the event. A third message can then be transmitted to the first network, where the third message is responsive to the first message and is encoded in the first protocol.

23 Claims, 5 Drawing Sheets

U.S. PATENT DOCUMENTS

| | | | |
|---|---|---|---|
| 5,043,872 A | 8/1991 | Cheng et al. |
| 5,163,148 A | 11/1992 | Walls |
| 5,212,787 A | 5/1993 | Baker et al. |
| 5,220,501 A | 6/1993 | Lawlor et al. |
| 5,224,034 A | 6/1993 | Katz et al. |
| 5,241,670 A | 8/1993 | Eastridge et al. |
| 5,291,583 A | 3/1994 | Bapat |
| 5,295,256 A | 3/1994 | Bapat |
| 5,313,664 A | 5/1994 | Sugiyama et al. |
| 5,386,413 A | 1/1995 | McAuley et al. |
| 5,426,780 A | 6/1995 | Gerull et al. |
| 5,448,623 A | 9/1995 | Wiedeman et al. |
| 5,448,727 A | 9/1995 | Annevelink |
| 5,450,477 A | 9/1995 | Amarant et al. |
| 5,452,451 A | 9/1995 | Akizawa et al. |
| 5,469,497 A | 11/1995 | Pierce et al. |
| 5,475,585 A | 12/1995 | Bush |
| 5,475,838 A | 12/1995 | Fehskens et al. |
| 5,483,445 A | 1/1996 | Pickering |
| 5,495,609 A | 2/1996 | Scott |
| 5,499,371 A | 3/1996 | Henninger et al. |
| 5,504,885 A | 4/1996 | Alashqur |
| 5,506,966 A | 4/1996 | Ban |
| 5,517,555 A | 5/1996 | Amadon et al. |
| 5,523,942 A | 6/1996 | Tyler et al. |
| 5,530,853 A | 6/1996 | Schell et al. |
| 5,544,302 A | 8/1996 | Nguyen |
| 5,548,749 A | 8/1996 | Kroenke et al. |
| 5,555,444 A | 9/1996 | Diekelman |
| 5,560,005 A | 9/1996 | Hoover et al. |
| 5,579,375 A | 11/1996 | Ginter |
| 5,590,395 A | 12/1996 | Diekelman et al. |
| 5,613,012 A | 3/1997 | Hoffman et al. |
| 5,615,109 A | 3/1997 | Eder |
| 5,615,249 A | 3/1997 | Solondz |
| 5,615,362 A | 3/1997 | Jensen et al. |
| 5,627,979 A | 5/1997 | Chang et al. |
| 5,644,736 A | 7/1997 | Healy et al. |
| 5,649,118 A | 7/1997 | Carlisle et al. |
| 5,666,648 A | 9/1997 | Stuart |
| 5,677,945 A | 10/1997 | Mullins et al. |
| 5,684,965 A | 11/1997 | Pickering |
| 5,694,598 A | 12/1997 | Durand et al. |
| 5,706,516 A | 1/1998 | Chang et al. |
| 5,717,924 A | 2/1998 | Kawai |
| 5,732,400 A | 3/1998 | Mandler et al. |
| 5,737,414 A | 4/1998 | Walker et al. |
| 5,745,754 A | 4/1998 | Lagarde et al. |
| 5,765,159 A | 6/1998 | Srinivasan |
| 5,778,189 A * | 7/1998 | Kimura et al. ................ 709/236 |
| 5,797,137 A | 8/1998 | Golshani et al. |
| 5,799,072 A | 8/1998 | Vulcan et al. |
| 5,799,087 A | 8/1998 | Rosen |
| 5,806,061 A | 9/1998 | Chaudhuri et al. |
| 5,809,503 A | 9/1998 | Aoshima |
| 5,815,807 A | 9/1998 | Osmani et al. |
| 5,822,747 A | 10/1998 | Graefe et al. |
| 5,832,068 A | 11/1998 | Smith |
| 5,842,220 A | 11/1998 | De Groot et al. |
| 5,845,206 A | 12/1998 | Castiel et al. |
| 5,845,274 A | 12/1998 | Chadha et al. |
| 5,850,544 A | 12/1998 | Parvathaneny et al. |
| 5,852,820 A | 12/1998 | Burrows |
| 5,854,835 A | 12/1998 | Montgomery et al. |
| 5,864,845 A | 1/1999 | Voorhees et al. |
| 5,870,473 A | 2/1999 | Boesch et al. |
| 5,870,724 A | 2/1999 | Lawlor et al. |
| 5,873,093 A | 2/1999 | Williamson et al. |
| 5,875,435 A | 2/1999 | Brown |
| 5,883,584 A | 3/1999 | Langemann et al. |
| 5,884,290 A | 3/1999 | Smorodinsky et al. |
| 5,893,108 A | 4/1999 | Srinivasan et al. |
| 5,898,762 A | 4/1999 | Katz |
| 5,909,440 A | 6/1999 | Ferguson et al. |
| 5,913,164 A | 6/1999 | Pawa et al. |
| 5,915,253 A | 6/1999 | Christiansen |
| 5,920,629 A | 7/1999 | Rosen |
| 5,924,094 A | 7/1999 | Sutter |
| 5,937,406 A | 8/1999 | Balabine et al. |
| 5,960,416 A | 9/1999 | Block |
| 5,963,648 A | 10/1999 | Rosen |
| 5,966,649 A | 10/1999 | Gulliford et al. |
| 5,970,417 A | 10/1999 | Toyryla et al. |
| 5,974,407 A | 10/1999 | Sacks |
| 5,974,441 A | 10/1999 | Rogers et al. |
| 5,974,506 A | 10/1999 | Sicola et al. |
| 5,983,223 A | 11/1999 | Perlman |
| 5,987,233 A | 11/1999 | Humphrey |
| 6,005,926 A | 12/1999 | Mashinsky |
| 6,011,795 A | 1/2000 | Varghese et al. |
| 6,012,057 A | 1/2000 | Mayer et al. |
| 6,016,341 A | 1/2000 | Lim |
| 6,021,409 A | 2/2000 | Burrows |
| 6,035,326 A | 3/2000 | Miles et al. |
| 6,047,067 A | 4/2000 | Rosen |
| 6,047,267 A | 4/2000 | Owens et al. |
| 6,047,284 A | 4/2000 | Owens et al. |
| 6,058,173 A | 5/2000 | Penfield et al. |
| 6,058,375 A | 5/2000 | Park |
| 6,061,679 A | 5/2000 | Bournas et al. |
| 6,061,763 A | 5/2000 | Rubin et al. |
| 6,067,574 A | 5/2000 | Tzeng |
| 6,070,051 A | 5/2000 | Astrom et al. |
| 6,075,796 A * | 6/2000 | Katseff et al. ................ 370/466 |
| 6,078,897 A | 6/2000 | Rubin et al. |
| 6,092,055 A | 7/2000 | Owens et al. |
| 6,112,190 A | 8/2000 | Fletcher et al. |
| 6,112,304 A | 8/2000 | Clawson |
| 6,141,759 A | 10/2000 | Braddy |
| 6,154,765 A | 11/2000 | Hart |
| 6,170,014 B1 | 1/2001 | Darago et al. |
| 6,185,225 B1 | 2/2001 | Proctor |
| 6,185,557 B1 | 2/2001 | Liu |
| 6,223,172 B1 | 4/2001 | Hunter et al. |
| 6,236,972 B1 | 5/2001 | Shkedy |
| 6,236,988 B1 | 5/2001 | Aldred |
| 6,243,760 B1 | 6/2001 | Armbruster et al. |
| 6,266,660 B1 | 7/2001 | Liu et al. |
| 6,311,185 B1 | 10/2001 | Markowitz et al. |
| 6,311,186 B1 | 10/2001 | MeLampy et al. |
| 6,314,365 B1 | 11/2001 | Smith |
| 6,321,205 B1 | 11/2001 | Eder |
| 6,336,135 B1 * | 1/2002 | Niblett et al. ................ 709/215 |
| 6,341,272 B1 | 1/2002 | Randle |
| 6,347,340 B1 | 2/2002 | Coelho et al. |
| 6,351,778 B1 | 2/2002 | Orton et al. |
| 6,356,897 B1 | 3/2002 | Gusack |
| 6,377,938 B1 | 4/2002 | Block et al. |
| 6,377,957 B1 | 4/2002 | Jeyaraman |
| 6,381,228 B1 | 4/2002 | Prieto et al. |
| 6,381,605 B1 | 4/2002 | Kothuri et al. |
| 6,381,607 B1 | 4/2002 | Wu et al. |
| 6,400,729 B1 * | 6/2002 | Shimadoi et al. ............ 370/466 |
| 6,400,925 B1 | 6/2002 | Tirabassi et al. |
| 6,401,098 B1 | 6/2002 | Moulin |
| 6,415,323 B1 | 7/2002 | McCanne et al. |
| 6,427,172 B1 | 7/2002 | Thacker et al. |
| 6,429,812 B1 | 8/2002 | Hoffberg |
| 6,442,652 B1 | 8/2002 | Laboy et al. |
| 6,446,068 B1 | 9/2002 | Kortge |
| 6,477,651 B1 | 11/2002 | Teal |
| 6,481,752 B1 | 11/2002 | DeJoseph |
| 6,490,592 B1 | 12/2002 | St. Denis et al. |
| 6,494,367 B1 | 12/2002 | Zacharias |
| 6,515,968 B1 | 2/2003 | Combar et al. |
| 6,529,915 B1 | 3/2003 | Owens et al. |
| 6,532,283 B1 | 3/2003 | Ingram |
| 6,553,336 B1 | 4/2003 | Johnson et al. |
| 6,563,800 B1 | 5/2003 | Salo et al. |
| 6,564,047 B1 | 5/2003 | Steele et al. |
| 6,564,247 B1 | 5/2003 | Todorov |
| 6,567,408 B1 | 5/2003 | Li et al. |
| 6,658,415 B1 | 12/2003 | Brown et al. |
| 6,658,463 B1 | 12/2003 | Dillon et al. |
| 6,662,180 B1 | 12/2003 | Aref et al. |
| 6,662,184 B1 | 12/2003 | Friedberg |
| 6,678,675 B1 | 1/2004 | Rothrock |

| | | |
|---|---|---|
| 6,700,869 B1 | 3/2004 | Falco et al. |
| 6,725,052 B1 | 4/2004 | Raith |
| 6,735,631 B1 | 5/2004 | Oehrke et al. |
| 6,779,030 B1 | 8/2004 | Dugan et al. |
| 6,819,933 B1 | 11/2004 | Tirabassi et al. |
| 6,885,734 B1 | 4/2005 | Eberle et al. |
| 6,901,507 B2 | 5/2005 | Wishneusky |
| 6,907,429 B2 | 6/2005 | Carneal et al. |
| 6,947,440 B2 | 9/2005 | Chatterjee et al. |
| 6,950,867 B1 | 9/2005 | Strohwig et al. |
| 6,963,636 B1 | 11/2005 | Kunugi et al. |
| 6,973,057 B1 | 12/2005 | Forslow |
| 7,003,280 B2 | 2/2006 | Pelaez et al. |
| 7,089,262 B2 | 8/2006 | Owens et al. |
| 7,181,537 B2 * | 2/2007 | Costa-Requena et al. ..... 709/246 |
| 7,233,918 B1 | 6/2007 | Ye et al. |
| 7,239,689 B2 | 7/2007 | Diomelli |
| 7,246,102 B2 | 7/2007 | McDaniel et al. |
| 7,257,611 B1 | 8/2007 | Shankar et al. |
| 7,391,784 B1 * | 6/2008 | Renkel .......................... 370/401 |
| 7,395,262 B1 | 7/2008 | Rothrock |
| 7,406,471 B1 | 7/2008 | Shankar et al. |
| 7,729,925 B2 | 6/2010 | Maritzen et al. |
| 7,756,763 B1 | 7/2010 | Owens et al. |
| 7,792,714 B1 | 9/2010 | Mills et al. |
| 7,809,768 B2 | 10/2010 | Owens et al. |
| 2001/0005372 A1 | 6/2001 | Cave et al. |
| 2001/0025273 A1 | 9/2001 | Walker et al. |
| 2001/0034704 A1 | 10/2001 | Farhat et al. |
| 2001/0040887 A1 | 11/2001 | Shtivelman et al. |
| 2001/0056362 A1 | 12/2001 | Hanagan et al. |
| 2002/0059163 A1 | 5/2002 | Smith |
| 2002/0073082 A1 | 6/2002 | Duvillier et al. |
| 2002/0078063 A1 | 6/2002 | Minder |
| 2002/0082881 A1 | 6/2002 | Price et al. |
| 2002/0087469 A1 | 7/2002 | Ganesan et al. |
| 2002/0106064 A1 | 8/2002 | Bekkevold et al. |
| 2003/0014361 A1 | 1/2003 | Klatt et al. |
| 2003/0014656 A1 | 1/2003 | Ault et al. |
| 2003/0016795 A1 | 1/2003 | Brandenberger |
| 2003/0097547 A1 | 5/2003 | Wishneusky |
| 2003/0105799 A1 | 6/2003 | Khan et al. |
| 2003/0118039 A1 * | 6/2003 | Nishi et al. ..................... 370/401 |
| 2003/0133552 A1 | 7/2003 | Pillai et al. |
| 2003/0172145 A1 | 9/2003 | Nguyen |
| 2003/0202521 A1 * | 10/2003 | Havinis et al. ................. 370/401 |
| 2004/0002918 A1 | 1/2004 | McCarthy et al. |
| 2004/0018829 A1 | 1/2004 | Raman et al. |
| 2004/0132427 A1 | 7/2004 | Lee et al. |
| 2004/0153407 A1 | 8/2004 | Clubb et al. |
| 2005/0018689 A1 * | 1/2005 | Chudoba .................... 370/395.5 |
| 2005/0033847 A1 * | 2/2005 | Roy ............................... 709/227 |
| 2005/0036487 A1 * | 2/2005 | Srikrishna ..................... 370/389 |
| 2005/0065880 A1 | 3/2005 | Amato et al. |
| 2005/0075957 A1 | 4/2005 | Pincus et al. |
| 2005/0091156 A1 | 4/2005 | Hailwood et al. |
| 2005/0107066 A1 | 5/2005 | Erskine et al. |
| 2005/0113062 A1 | 5/2005 | Pelaez et al. |
| 2005/0120350 A1 | 6/2005 | Ni et al. |
| 2005/0125305 A1 | 6/2005 | Benco et al. |
| 2005/0187841 A1 | 8/2005 | Grear et al. |
| 2005/0238154 A1 | 10/2005 | Heaton et al. |
| 2006/0010057 A1 | 1/2006 | Bradway et al. |
| 2006/0025131 A1 * | 2/2006 | Adamany et al. ........... 455/432.1 |
| 2006/0035637 A1 | 2/2006 | Westman |
| 2006/0045250 A1 | 3/2006 | Cai et al. |
| 2006/0056607 A1 | 3/2006 | Halkosaari |
| 2006/0114932 A1 * | 6/2006 | Cai et al. ........................ 370/466 |
| 2006/0148446 A1 * | 7/2006 | Karlsson ........................ 455/406 |
| 2006/0168303 A1 | 7/2006 | Oyama et al. |
| 2006/0190478 A1 | 8/2006 | Owens et al. |
| 2006/0248010 A1 | 11/2006 | Krishnamoorthy et al. |
| 2007/0091874 A1 | 4/2007 | Rockel |
| 2007/0133575 A1 | 6/2007 | Cai et al. |
| 2007/0198283 A1 | 8/2007 | Labuda |
| 2007/0288367 A1 | 12/2007 | Krishnamoorthy et al. |
| 2007/0288368 A1 | 12/2007 | Krishnamoorthy et al. |
| 2008/0033873 A1 | 2/2008 | Krishnamoorthy et al. |
| 2008/0033874 A1 | 2/2008 | Krishnamoorthy et al. |
| 2008/0040267 A1 | 2/2008 | Krishnamoorthy et al. |
| 2008/0126230 A1 | 5/2008 | Bellora et al. |
| 2008/0215474 A1 | 9/2008 | Graham |
| 2008/0311883 A1 | 12/2008 | Bellora et al. |

FOREIGN PATENT DOCUMENTS

| | | |
|---|---|---|
| WO | WO 95/04960 A2 | 2/1995 |
| WO | WO 95/27255 A1 | 10/1995 |
| WO | WO 96/34350 A1 | 10/1996 |
| WO | WO 97/03406 A1 | 1/1997 |
| WO | WO 98/52131 A1 | 11/1998 |
| WO | WO 2007/002841 A2 | 1/2007 |
| WO | WO 2007/016412 A2 | 2/2007 |

OTHER PUBLICATIONS

Non-Final Office Action for U.S. Appl. No. 09/562,875, mailed on Jul. 25, 2006; pp. 18.
Final Office Action for U.S. Appl. No. 09/562,875, mailed on Sep. 27, 2004; pp. 18.
Non-Final Office Action for U.S. Appl. No. 09/562,875, mailed on Feb. 17, 2004; pp. 11.
Search Report for Application PCT/US06/29571, mailed on Apr. 16, 2007; pp. 2.
Written Opinion for Application PCT/US06/29571, mailed on Apr. 16, 2007; pp. 7.
Search Report for Application PCT/US06/25405, mailed on Apr. 3, 2008, pp. 2.
Written Opinion for Application PCT/US06/25405, mailed on Apr. 3, 2008, pp. 3.
Agarwal et al., "Architecting Object Applications for High Performance With Relational Databases", Aug. 10, 1995, pp. 1-8.
Blaha, Michael R. et al., "Relational Database Design Using an Object Oriented Methodology", Communication of the ACM, Apr. 1988, vol. 31, No. 4, pp. 414-427.
Borland's Paradox for Windows User Guide, Version 5.0, Borland International, Inc., 1994, 185 pages.
Chester, Thomas et al., Mastering Excel 97, 4th Ed., Sybex Inc., Alameda, CA, 1997, 200 pages.
Davis, Charles, "Online Financing to Boost Procurement", Electronic Payments International, p. 14, Feb. 2000, 3 pages total.
Derfler, Frank J. et al., "How Networks Work", Millenium Ed., Que Corporation, Jan. 2000, 249 pages.
Gavron, Jacquelyn et al., "How to Use Microsoft Windows NT 4 Workstation", MacMillan Computer Publishing, USA, 1996, 25 pages.
Gomez-Perez et al., "Towards a Method to Conceptualize Domain Ontologies", Workshop on Ontological Engineering, ECAI' 96, Budapest, Aug. 12, 1996, pp. 41-51.
Gralla, Preston, "How the Internet Works", Millenium Ed., Que Corporation, Aug. 1999, 357 pages.
Horngren, Charles T. et al., "Introduction to Financial Accounting", Revised 3rd Ed., Prentice-Hall, Inc., 1988, 561 pages.
Iannella et al., "Metadata: Enabling the Internet", Jan. 1997, Research Data Network CRC, pp. 1-7.
Kung, "Object Subclass Hierarchy in SQL: A Simple Approach", Jul. 1990, Communications of the ACM, vol. 33, No. 7, pp. 117-125.
Muller, Nathan J., "Desktop Encyclopedia of the Internet", Artech House, Inc., 1998, 603 pages.
ORACLE Applications, Concepts, Release 11 for UNX, Apr. 1998, 90 pgs.
ORACLE7 Server Distribution Systems, vol. II: Replicated Data, Release 7.3, Feb. 1996, 469 pgs.
Peachtree, "Using General Ledger User Guide", Peachtree Software, Inc., 1989, 319 pages.
PR Newswire, "Regions to Offer Secure Internet Banking from Security First Technologies", Apr. 3, 1997, p. 0403ATTH003, 3 pgs.
Reinwald et al., "Storing and Using Objects in a Relational Database", IBM Systems Journal, vol. 35, No. 2, May 1996, pp. 172-191.
Riley, David D., "Data Abstraction and Structures: An Introduction to Computer Science II", Boyd and Fraser Publishing Company, 1987, 30 pages.
Shah, Ashwin V. et al., "DSM: An Object-Relationship Modeling Language", OOPSLA '89, Oct. 1-6, 1989, pp. 181-202.

Skold, Martin, "QDB—A Query Processor for the High Performance, Parallel Data Server NDB Cluster", Linkopings University, Sweden, Apr. 1999, 28 pgs.

St. Pierre et al., "Issues in Crosswalking Content Metadata Standards", Oct. 15, 1998, National Information Standards Organization, pp. 1-8.

Syverson, Nancy, "Inside Graybar: A Profile of the Nation's Top Electrical Distributor", Industrial Maintenance and Plant Operation, vol. 61, No. 11, p. 14, Nov. 2000, 4 pages total.

White, Ron, "How Computers Work", Millenium Ed., Que Corporation, Sep. 1999, 321 pages.

Notice of Allowance for U.S. Appl. No. 09/569,097 mailed on Mar. 5, 2010; 9 pages.

Non-Final Office Action for U.S. Appl. No. 09/569,097 mailed on Sep. 1, 2009; 6 pages.

Advisory Action for U.S. Appl. No. 09/569,097 mailed on May 11, 2009; 3 pages.

Final Office Action for U.S. Appl. No. 09/569,097 mailed on Mar. 4, 2009; 8 pages.

Non-Final Office Action for U.S. Appl. No. 09/569,097 mailed on Sep. 3, 2008; 6 pages.

Advisory Action for U.S. Appl. No. 09/569,097 mailed on May 6, 2008; 3 pages.

Final Office Action for U.S. Appl. No. 09/569,097 mailed on Feb. 11, 2008; 6 pages.

Non-Final Office Action for U.S. Appl. No. 09/569,097 mailed on Aug. 9, 2007; 8 pages.

Final Office Action for U.S. Appl. No. 09/569,097 mailed on Jun. 16, 2005; 16 pages.

Non-Final Office Action for U.S. Appl. No. 09/569,097 mailed on Oct. 7, 2004; 12 pages.

Advisory Action for U.S. Appl. No. 09/569,097 mailed on Jun. 24, 2004; 2 pages.

Final Office Action for U.S. Appl. No. 09/569,097 mailed on Jan. 28, 2004; 8 pages.

Non-Final Office Action for U.S. Appl. No. 09/569,097 mailed on Jul. 3, 2003; 8 pages.

Non-Final Office Action for U.S. Appl. No. 09/569,097 mailed on Oct. 7, 2002; 6 pages.

Notice of Allowance for U.S. Appl. No. 09/617,590 mailed on Mar. 27, 2007; 10 pages.

Non-Final Office Action for U.S. Appl. No. 09/617,590 mailed on Sep. 27, 2006; 9 pages.

Non-Final Office Action for U.S. Appl. No. 09/617,590 mailed on Jul. 25, 2006; 9 pages.

Final Office Action for U.S. Appl. No. 09/617,590 mailed on Jun. 14, 2005; 10 pages.

Non-Final Office Action for U.S. Appl. No. 09/617,590 mailed on Nov. 16, 2004; 11 pages.

Non-Final Office Action for U.S. Appl. No. 09/617,590 mailed on Feb. 17, 2004; 11 pages.

Notice of Allowance for U.S. Appl. No. 09/967,493 mailed on Apr. 11, 2008; 12 pages.

Non-Final Office Action for U.S. Appl. No. 09/967,493 mailed on Sep. 11, 2007; 15 pages.

Final Office Action for U.S. Appl. No. 09/967,493 mailed on Dec. 19, 2006; 33 pages.

Non-Final Office Action for U.S. Appl. No. 09/967,493 mailed on May 16, 2006; 26 pages.

Final Office Action for U.S. Appl. No. 09/967,493 mailed on Aug. 19, 2005; 23 pages.

Non-Final Office Action for U.S. Appl. No. 09/967,493 mailed on Dec. 2, 2004; 22 pages.

Non-Final Office Action for U.S. Appl. No. 09/967,493 mailed on Jan. 14, 2004; 15 pages.

Notice of Allowance for U.S. Appl. No. 10/375,694 mailed on Apr. 3, 2006; 4 pages.

Non-Final Office Action for U.S. Appl. No. 10/375,694 mailed on Oct. 13, 2005; 9 pages.

Final Office Action for U.S. Appl. No. 10/375,694 mailed on May 13, 2005; 13 pages.

Non-Final Office Action for U.S. Appl. No. 10/375,694 mailed on Sep. 7, 2004; 12 pages.

Non-Final Office Action for U.S. Appl. No. 10/394,409 mailed on Nov. 3, 2010; 14 pages.

Non-Final Office Action for U.S. Appl. No. 10/394,409 mailed on May 25, 2010; 11 pages.

Advisory Action for U.S. Appl. No. 10/394,409 mailed on Oct. 23, 2009; 3 pages.

Final Office Action for U.S. Appl. No. 10/394,409 mailed on Aug. 19, 2009; 11 pages.

Non-Final Office Action for U.S. Appl. No. 10/394,409 mailed on Mar. 4, 2009; 13 pages.

Advisory Action for U.S. Appl. No. 10/394,409 mailed on Jan. 23, 2009; 3 pages.

Final Office Action for U.S. Appl. No. 10/394,409 mailed on Sep. 29, 2008; 19 pages.

Non-Final Office Action for U.S. Appl. No. 10/394,409 mailed on Feb. 21, 2008; 21 pages.

Non-Final Office Action for U.S. Appl. No. 10/394,409 mailed on Aug. 3, 2007; 11 pages.

Advisory Action for U.S. Appl. No. 10/394,409 mailed on May 2, 2007; 3 pages.

Final Office Action for U.S. Appl. No. 10/394,409 mailed on Feb. 22, 2007; 13 pages.

Non-Final Office Action for U.S. Appl. No. 10/394,409 mailed on Sep. 1, 2006; 9 pages.

Notice of Allowance for U.S. Appl. No. 10/706,151 mailed on Apr. 18, 2008; 8 pages.

Non-Final Office Action for U.S. Appl. No. 10/706,151 mailed on Oct. 10, 2007; 5 pages.

Final Office Action for U.S. Appl. No. 10/706,151 mailed on Mar. 23, 2006; 9 pages.

Non-Final Office Action for U.S. Appl. No. 10/706,151 mailed on Sep. 16, 2005; 7 pages.

Final Office Action for U.S. Appl. No. 10/706,151 mailed on May 13, 2005; 7 pages.

Non-Final Office Action for U.S. Appl. No. 10/706,151 mailed on Oct. 20, 2004; 5 pages.

Notice of Allowance for U.S. Appl. No. 11/414,072 mailed on Jun. 1, 2010; 14 pages.

Advisory Action for U.S. Appl. No. 11/414,072 mailed on Dec. 28, 2009; 3 pages.

Final Office Action for U.S. Appl. No. 11/414,072 mailed on Oct. 16, 2009; 19 pages.

Non-Final Office Action for U.S. Appl. No. 11/414,072 mailed on Mar. 24, 2009; 16 pages.

Advisory Action for U.S. Appl. No. 11/414,072 mailed on Jan. 9, 2009; 3 pages.

Final Office Action for U.S. Appl. No. 11/414,072 mailed on Oct. 23, 2008; 21 pages.

Non-Final Office Action for U.S. Appl. No. 11/414,072 mailed on Apr. 24, 2008; 33 pages.

Final Office Action for U.S. Appl. No. 11/415,759 mailed on Nov. 17, 2010; 9 pages.

Non-Final Office Action for U.S. Appl. No. 11/415,759 mailed on Mar. 30, 2010; 9 pages.

Non-Final Office Action for U.S. Appl. No. 11/478,558 mailed on Oct. 21, 2010; 32 pages.

Non-Final Office Action for U.S. Appl. No. 11/496,057 mailed on Jul. 21, 2010; 44 pages.

Advisory Action for U.S. Appl. No. 11/760,427 mailed on Aug. 30, 2010; 3 pages.

Final Office Action for U.S. Appl. No. 11/760,427 mailed on Jun. 25, 2010; 31 pages.

Non-Final Office Action for U.S. Appl. No. 11/760,427 mailed on Dec. 11, 2009; 13 pages.

Final Office Action for U.S. Appl. No. 11/760,519 mailed on Jul. 26, 2010; 33 pages.

Non-Final Office Action for U.S. Appl. No. 11/760,519 mailed on Jan. 21, 2010; 9 pages.

* cited by examiner

GATEWAY FOR ACHIEVING LOW LATENCY AND HIGH AVAILABILITY IN A REAL TIME EVENT PROCESSING SYSTEM

CROSS-REFERENCES TO RELATED APPLICATIONS

This application claims the benefit of U.S. Provisional Application No. 60/737,429, filed Nov. 15, 2005 by Rockel et al. and entitled "Revenue Management Systems and Method," which is incorporated herein by reference.

This application is also related to the following commonly-owned, co-pending applications (the "Related Applications"), of which the entire disclosure of each is incorporated by reference:

U.S. patent application Ser. No. 09/569,097, filed May 14, 1997, by Owens et al. and entitled "Method and Apparatus for Providing a Clean Accounting Close for a Real-Time Billing System"; U.S. patent application Ser. No. 10/706,151, filed Mar. 30, 2000, now U.S. Pat. No. 7,395,262, issued Jul. 1, 2008, by Rothrock and entitled "Techniques for Searching for Best Matches in Tables of Information"; U.S. patent application Ser. No. 09/562,785, filed May 2, 2000, now U.S. Pat. No. 7,257,611, issued Aug. 14, 2007, by Shankar et al. and entitled "Distributed Nonstop Architecture for an Event Processing System"; U.S. patent application Ser. No. 09/617,590, filed Jul. 18, 2000, now U.S. Pat. No. 7,233,918, issued Jun. 19, 2007, by Ye et al. and entitled "Rating Billing Events in Real Time According to Account Usage Information"; U.S. patent application Ser. No. 09/967,493, filed Sep. 27, 2001, now U.S. Pat. No. 7,406,471, issued Jul. 29, 2008, by Shankar et al. and entitled "Scalable Multi-Database Event Processing System Using Universal Subscriber-Specific Data and Universal Global Data"; U.S. patent application Ser. No. 10/394,409, filed Mar. 21, 2003, by Labuda et al. and entitled "Transaction in Memory Object Store"; U.S. patent application Ser. No. 11/415,759, filed May 1, 2006, now U.S. Publication No. 2006/0248010, published Nov. 2, 2006, by Krishnamoorthy et al. and entitled "Revenue Management Systems and Methods"; U.S. patent application Ser. No. 11/478,558, filed Jun. 28, 2006, now U.S. Publication No. 2007/0091874, published Apr. 26, 2007, by Rockel et al. and entitled "Revenue Management System and Method"; and U.S. patent application Ser. No. 11/496,057, filed Jul. 28, 2006, now U.S. Publication No. 2007/0198283, published Aug. 23, 2007, by Labuda et al. and entitled "Revenue Management System and Method."

BACKGROUND OF THE INVENTION

Embodiments of the present invention relate generally to computer gateways. More particularly, embodiments of the present invention relate to a gateway for achieving low latency and high availability in a real time event processing system.

In computer parlance, a gateway interfaces two or more networks that use different communications protocols (for the purposes of this description, a "network" may comprise one or more computing devices). A gateway may be implemented in hardware or software, and performs the tasks of receiving a network message in the protocol language of the "source" network, translating the message to the protocol language of the "destination" network, and then transmitting the translated message to the "destination" network. Gateways are commonly used, for example, to interface local area networks (IPX/SPX protocol) to the Internet (TCP/IP protocol).

Gateways are also used in the context of event processing systems. Service providers in the telecommunications and media sectors operate such systems to manage business events involving subscriber access, billing, and account settlement. These systems may include a "satellite" network that tracks subscriber actions and generates business events based on those actions, and a "management" network that processes the business events and sends responses to the satellite network. A gateway is employed to enable inter-network communication between the two.

Recently, service providers have sought to improve the performance of their event processing systems to meet new market demands. One such market demand is the option of prepaying for services. Traditionally, a subscriber is granted access to a service and is billed at the end of a periodic cycle for her usage over the preceding period. This is known as postpaid billing. However, a subscriber may prefer to prepay for a fixed quantum of service access in order to, for example, budget her usage, or avoid the inconvenience of a monthly bill or long-term service contract. Additionally, service providers may, at times, choose to charge in a prepaid fashion even for postpaid customers in order to limit credit exposure or fraud.

A system for managing prepaid service access should provide real time tracking and settlement of subscriber authorization, authentication and accounting events. In turn, the gateway that sits between the "satellite" and "management" networks should provide for (1) low latency in relaying events and responses between satellite and management networks; and (2) high availability of the management network. However, current state-of-the-art gateways are not adapted to meet these demands. For example, current gateways do not have a mechanism for providing that time-sensitive network messages sent from a source network (such as a service provider's satellite network) to a destination network (such as a service provider's management network) are responded to within a given time interval. They also do not support multiple, load-balanced connections to a destination network.

Hence, there is a need in the art for an improved gateway that can achieve low latency and high availability in a distributed system such as a real time event processing system.

BRIEF SUMMARY OF THE INVENTION

Methods, machine-readable media, and apparatuses are disclosed for interfacing computer networks. According to one embodiment of the present invention, a method for interfacing a first network with a second network can comprise receiving an event in the form of a first message from the first network. The first message can be encoded using a first protocol, such as MBI or Diameter protocol. The first message can be translated into a second message, where the second message is encoded using a second protocol, such as Portal Communication Protocol. The second message can be transmitted to the second network. If a response is not received from the second network within a configurable interval, the event can be processed based upon at least one rule that is responsive to the event. A third message can then be transmitted to the first network, where the third message is responsive to the first message and is encoded in the first protocol.

According to another embodiment of the present invention, the method can further comprise maintaining at least two simultaneous connections to the second network.

According to yet another embodiment of the present invention, the method can further comprise determining which of the at least two simultaneous connections to use in transmitting the second message to the second network.

According to one aspect of the present invention, a machine-readable medium can have stored thereof a series of instructions which, when executed by a processor, cause the processor to interface a first network with a second network by receiving an event in the form of a first message from the first network. The first message can be encoded using a first protocol, such as MBI or Diameter protocol. The first message can be translated into a second message, where the second message is encoded using a second protocol, such as Portal Communication Protocol. The second message can be transmitted to the second network. If a response is not received from the second network within a configurable interval, the event can be processed based upon at least one rule that is responsive to the event. A third message can then be transmitted to the first network, where the third message is responsive to the first message and is encoded in the first protocol.

According to another aspect of the present invention, the machine-readable medium can further comprise instructions to maintain at least two simultaneous connections to the second network.

According to yet another aspect of the present invention, the machine-readable medium can further comprise instructions to determine which of the at least two simultaneous connections to use in transmitting the second message to the second network.

According to still another aspect of the present invention, the machine-readable medium can further comprise instructions to enable translation of a third protocol.

According to one embodiment of the present invention, an apparatus that interfaces a first network with a second network can include one or more communication interfaces, one or more storage devices, and one or more processors. The one or more processors can be communicatively coupled to the one or more communication interfaces and the one or more storage devices. Furthermore, the one or more processors can be adapted to receive an event in the form of a first message from the first network. The first message can be encoded using a first protocol, such as MBI or Diameter protocol. The one or more processors can be adapted to translate the first message into a second message, where the second message is encoded using a second protocol, such as Portal Communication Protocol, and transmit the second message to the second network. If a response to the second message is not received from the second network within a configurable interval, the one or more processors can be adapted to process the event based on at least one rule that is responsive to the event. Finally, the one or more processors can be adapted to transmit a third message to the first network, where the third message is responsive to the first message and is encoded in the first protocol.

According to another embodiment of the present invention, the apparatus may further include at least two communications interfaces that are in simultaneous communication with the second network.

According to yet another embodiment of the present invention, the one or more processors may be further adapted to determine which of the at least two communication interfaces in simultaneous connection with the second network to use in transmitting the second message to the second network.

According to still another embodiment of the present invention, the apparatus may further include logic stored on the one or more storage devices that allows translation of a third protocol.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention relate to a gateway that can provide (1) low latency in relaying events and responses between source and destination networks; and (2) high availability of a destination network. Thus, various embodiments of the present invention may be particularly useful in a real time event processing system (although they may not be limited thereto). According to one embodiment, a gateway can implement a "time-out" monitoring facility wherein an incoming event is timed from the moment it is received from a source network. If a response to the event is not received from the destination network within a configurable interval (indicating a "time-out"), the gateway can process the event based on one or more business rules that are responsive to the event. The gateway can then transmit a response to the original source network. In this fashion, the source network can be provided a low-latency response to time-sensitive events. In some embodiments, the timed-out event is discarded after it is processed locally by the gateway. In other embodiments, the timed-out event can be written to a local or networked storage device (such as Random Access Memory (RAM), flash memory, hard disk, optical disk, or the like) for later communication to the destination network.

According to another embodiment, a gateway can maintain multiple simultaneous connections to a destination network to ensure high availability. For example, if one network connection fails, the gateway can use the other connection to transmit a message to the destination. The gateway can also determine which of the simultaneous connections to use based on one or more factors such as their relative speed.

According to yet another embodiment, a gateway can be upgraded in a modular fashion to support new network protocols or new types of events. For example, a set of one or more "plug-ins" may be provided that correspond to additional translation schemes or business logic components. In such case, upgrading may comprise adding the one or more plug-ins to the gateway. Thus, if a service provider introduces a service that requires the processing of a new authorization event, the gateway can be easily modified to process the new event in the case of a time-out.

Figure 1:
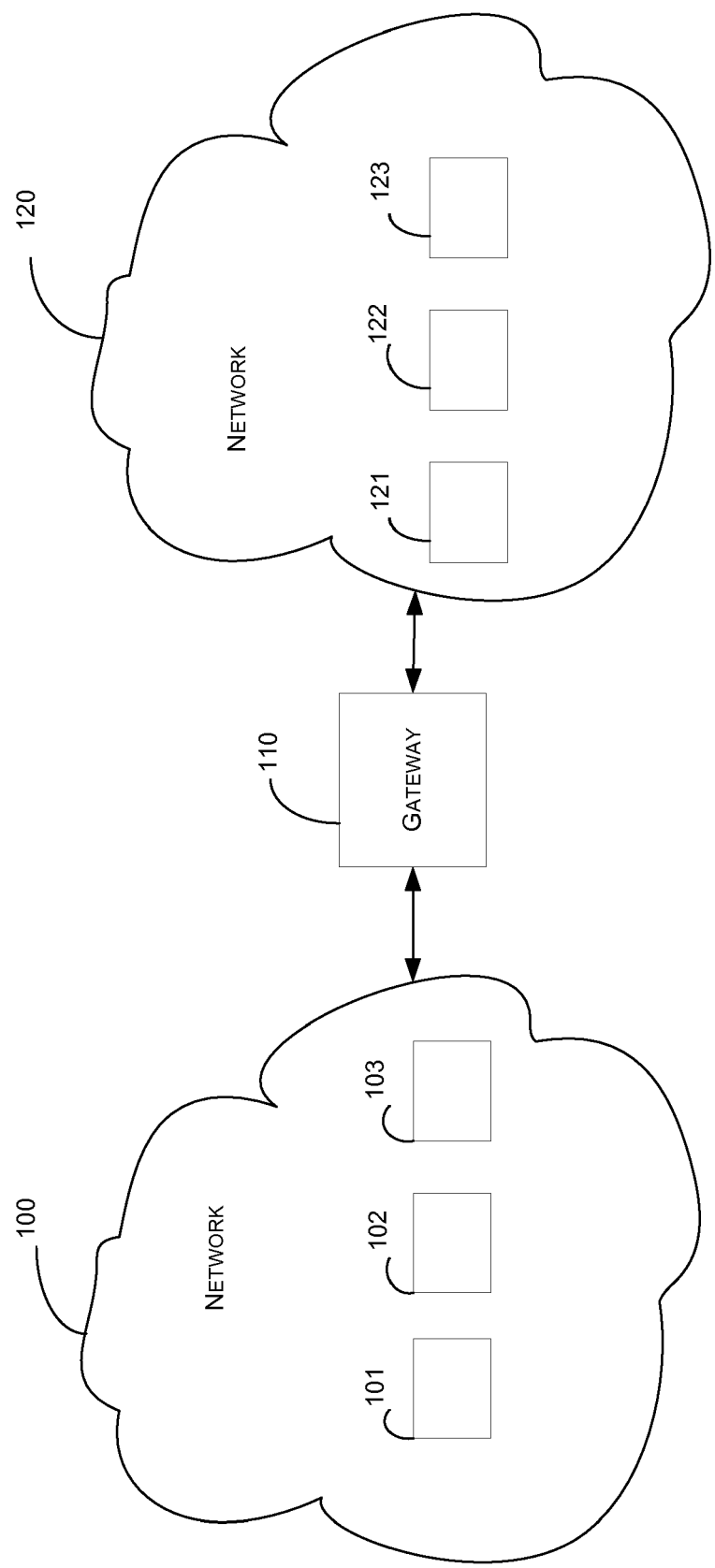
FIG. 1 is a block diagram illustrating exemplary components of a network environment in which an embodiment of the present invention may be implemented.

FIG. 1 is a block diagram illustrating exemplary components of a network environment in which an embodiment of the present invention may be implemented. In this simple example, gateway 110 interfaces networks 100 and 120, which include network nodes 101, 102, 103, 121, 122, and 123. Nodes 101, 102, 103, 121, 122, and 123 may represent any type of computer, computing device, or electronic device capable of communicating via a network, such as a general purpose personal computer, cell phone, PDA, and/or workstation computer. Although networks 100 and 120 are depicted as comprising three nodes each, any number of nodes may be present. For example, networks 100 and 120 may each comprise one computing system.

With respect to network protocols, networks 100 and 120 may represent any type of telecommunications or computer network utilizing any type of communications protocol. Such protocols may include, but are not limited to, HP OpenCall's MBI, Diameter, Radius, FLIST, TCP/IP, IPX/SPX, HTTP, IMAP, SMNP, and Portal Communication Protocol. In operation, gateway 110 translates network messages from the protocol language of network 110 to the protocol language of network 120, and vice versa. As mentioned previously, gateway 110 may also perform additional tasks based on the content of the network messages (e.g. business events) in order to ensure a minimum quality of service between networks 100 and 120. Such details are discussed in further detail below.

Figure 2:
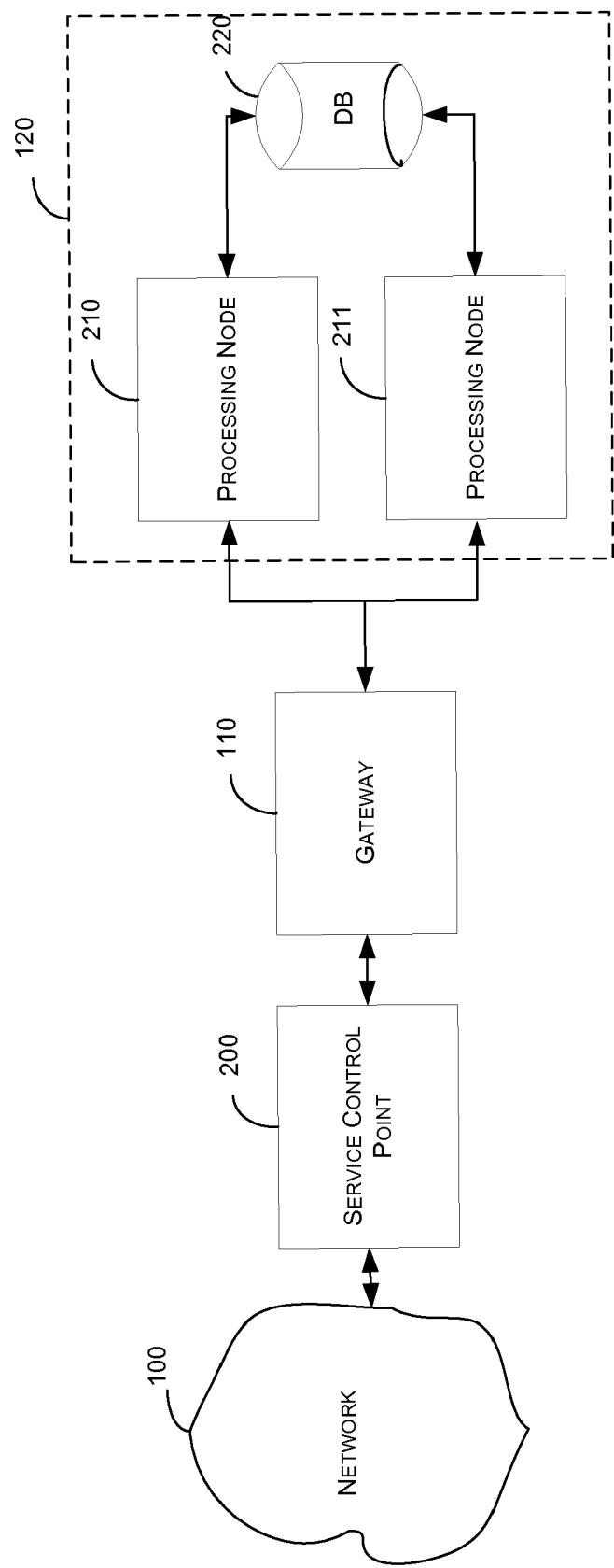
FIG. 2 is a block diagram illustrating exemplary components of another network environment in which an embodiment of the present invention may be implemented.

FIG. 2 is a block diagram illustrating exemplary components of another network environment in which an embodiment of the present invention may be implemented. This example shows an embodiment of the present invention in the context of a service provider's event processing system. Thus, network 100 represents a "satellite" network and network 120 represents a "management" network. As in FIG. 1, gateway 110 interconnects networks 100 and 120.

Satellite network 110 can log subscriber actions (such as wireless or wired phone calls) and send records of those actions to a service control point 200. In turn, service control point 200 generates business events (such as authorization, authentication, rating, or account update events) and transmits those events to management network 120, via gateway 110, for processing.

Management network 120 can process the events received from service control point 200 at processing node 210 or 211. A record of the event can then be stored in database 220, and a response can be transmitted, via gateway 110, back to network 100. Processing nodes 210 and 211 may be computing systems such as general purpose computers, specialized server computers (including, but not limited to, PC servers, UNIX servers, mid-range servers, mainframe computers, or rack-mounted servers), server farms, server clusters, or the like. Alternatively, nodes 210 and 211 may be separate processors within a single computing platform, or even separate processes or threads within a single processor. Database 220 may be any type of data repository or any combination of data repositories.

As shown in FIG. 2, gateway 110 may simultaneously connect to at least two distinct processing nodes 210 and 211 in network 120. This enables gateway 110 to continue to transmit messages to network 120 in the event that a network connection, or a processing node, fails. In other embodiments, gateway 110 may utilize two or more simultaneous connections to a single processing node, or a single connection to multiple processing nodes.

Here, satellite network 100 may be a cellular satellite network, and management network 120 may be a billing and access management system. A cellular phone user-connected to network 100 can place a long-distance phone call, which generates an authorization request at service control point 200. The authorization request is forward to gateway 110, where it is translated into the protocol of system 120, and then transmitted to a processing node 210 or 211. The processing node can authorize or deny the request, and then transmit this response back through gateway 110 to cellular satellite network 100.

Figure 3:
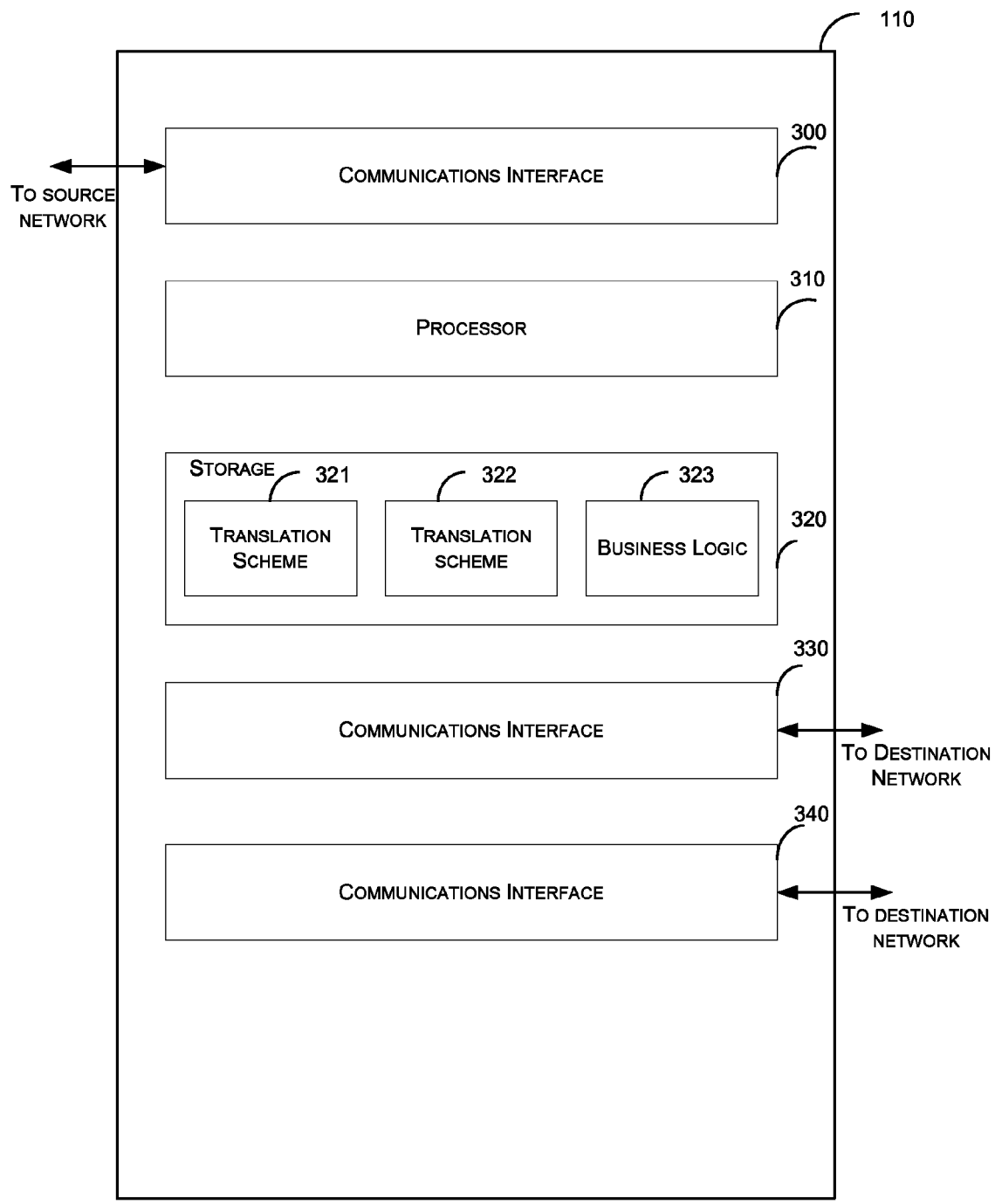
FIG. 3 is a block diagram illustrating exemplary components of a gateway, in accordance with an embodiment of the present invention.

FIG. 3 is a block diagram illustrating the components of exemplary gateway 110, in accordance with an embodiment of the present invention. In this example, gateway 110 includes one or more communication interfaces 300, 330, and 340, one or more processors 310 (e.g., CPUs), and one or more storage devices 320. Processor 310 is communicatively coupled to communications interfaces 300, 330, and 340 and storage device 320, and is responsible for executing the core functions of gateway 110. For example, among other operations, processor 310 executes the "time-out" monitoring logic previously described to enable low-latency operation of the gateway. The functional components of processor 310 are depicted in further detail in FIG. 4.

Storage device 320 may be a data repository or a combination of data repositories that contains, among other data, translation schemes 321 and 322, and business logic 323. Storage 320 may be physically implemented as RAM, ROM, flash memory, a hard disk, an optical disk, or any other type of local or networked data storage device. Translation schemes 321 and 322 are modular components that enable processor 310 to perform its duty of translating network messages from the protocol language of network 100 to the protocol language of network 120, and vice versa. Storage 320 may also contain additional translation schemes for protocols used by other networks. It is contemplated that translation schemes may be easily added or removed as needed to support different types of networks.

Business logic 323 is another modular component that contains one or more business rules. These business rules are applied when a "time-out" occurs to enable gateway 110 to locally process and respond to an event. For example, component 323 may contain a rule that authorizes subscriber requests for placing a local phone call, but denies subscriber requests for placing long-distance phone calls. As with translation schemes 321 and 322, business logic 323 and other business logic components may be added or removed as needed to support the processing of different types of events.

Communication interfaces 300, 330, and 340 are network "sockets" that connect gateway 110 with networks 100 and 120. In an exemplary embodiment, at least one interface 300 is in communication with a source network (such as network 100), and at least two interfaces 330 and 340 are in communication with a destination network (such as network 120). In other embodiments, alternative configurations may be possible.

Figure 4:
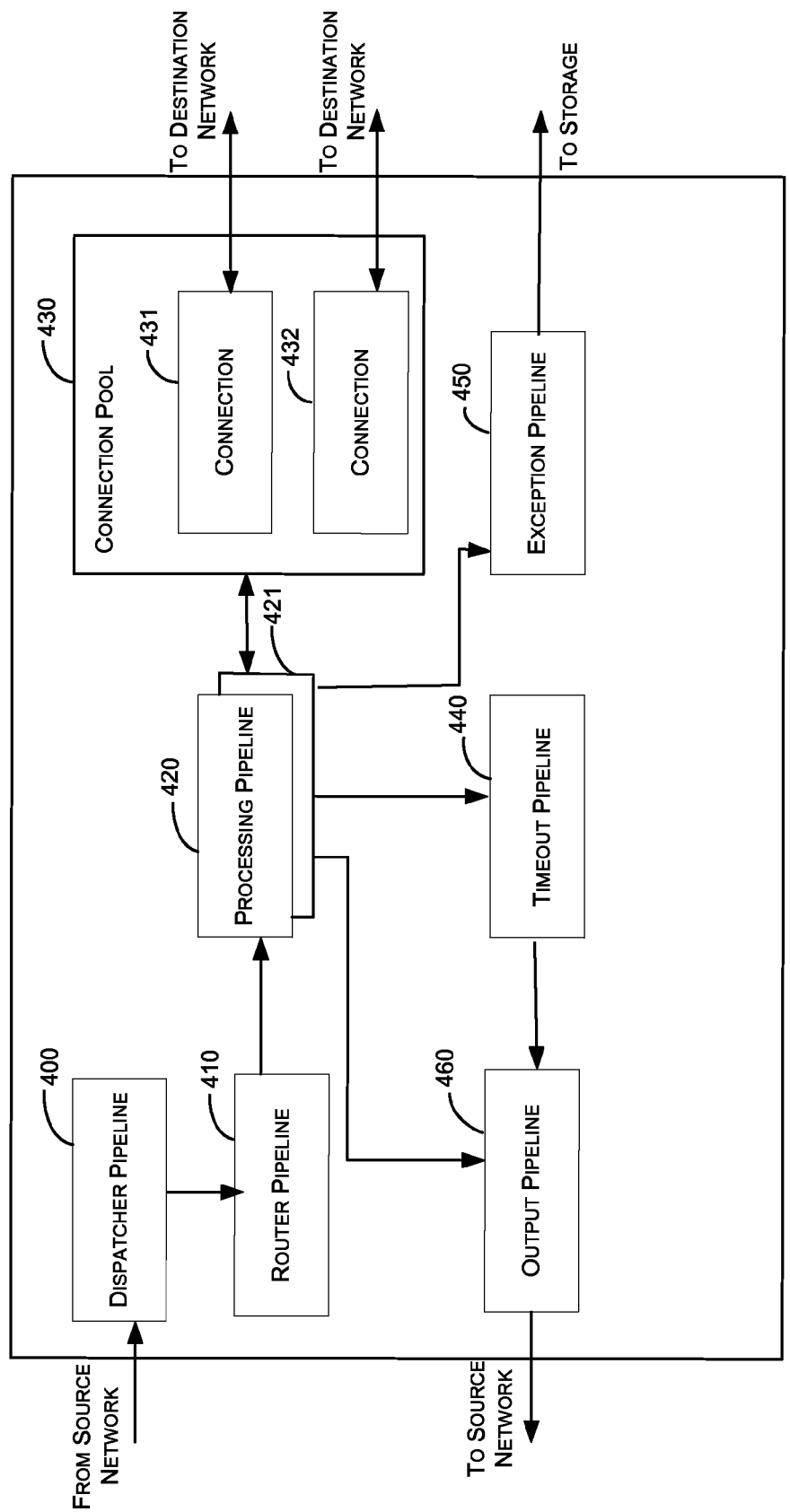
FIG. 4 is a block diagram illustrating the functional architecture of a gateway and a process flow for processing an event in the gateway, in accordance with an embodiment of the present invention.

FIG. 4 is a block diagram illustrating the functional architecture of a gateway and a process flow for processing an event in the gateway, in accordance with an embodiment of the present invention. Specifically, FIG. 4 illustrates how exemplary gateway 110 implements its "time-out" monitoring facility for incoming events. The functional components depicted here may be implemented in hardware as separate components of processor 310, or separate processors of gateway 110. Alternatively, they may be implemented in software as separate processes or threads in processor 310, or separate processes or threads across multiple processors. Furthermore, the architecture of FIG. 4 may be arranged using different sets of components, different arrangements of components, or any other configuration.

The process begins when dispatcher pipeline 400 receives an event in the form of a network message from communications interface 300. Dispatcher pipeline 400 translates the network message into an internal format according to translation scheme 321 or 322, starts a timer, and relays the translated message to router pipeline 410. Router pipeline 410 can evaluate the type business event encapsulated in the message and send the message to the correct processing pipeline 420 or 421. For example, processing pipeline 420 may be adapted to processing authorization events, and processing pipeline 421 may be adapted to processing accounting events. Thus, if the current event is an accounting event, router pipeline 410 will forward the message to processing pipeline 421. In some embodiments, there may be only a single processing pipeline 420 that handles all types of events. In that case, dispatcher pipeline 400 may pass the message directly to the single processing pipeline, thereby bypassing a routing stage. In other embodiments, there may be more than two processing pipelines.

Processing pipeline 420 or 421 translates the message into the protocol language of the destination network and obtains a connection from connection pool 430. As shown, connection pool 430 maintains at least two simultaneous connections 431 and 432 to the destination network. Processing pipelines 420 and 421 may implement logic that selects a connection based on one or more factors, such as their relative load or speed. Or the processing pipelines may select the first connection that is not in use by another processing pipeline. In either case, processing pipeline 420 or 421 transmits the translated message through connection 431 or 432 to the destination network.

If the processing pipeline receives a response to the message/event from the destination network before the timer reaches a threshold value, the response is forwarded to output pipeline 460. Output pipeline 460 translates the response into the protocol language of the source network and then transmits it to the source network through communications interface 300.

If the processing pipeline does not receive a response to the message/event from the destination network before the timer reaches the threshold value (indicating the destination is unavailable or operating too slowly), the message is forwarded to timeout pipeline 440 for local processing. Specifically, timeout pipeline 440 evaluates the business event encapsulated in the message, applies one or more business rules from business logic 323 that are responsive to the event, and formulates a response. Timeout pipeline then forwards this response to output pipeline 460 for transmittal to the source network. In various embodiments, processing pipelines 420 and 421 may also send a timed-out event to exception pipeline 450. This pipeline writes the timed-out event to storage 320 so that it can be re-communicated to the destination network once it becomes available.

Figure 5:
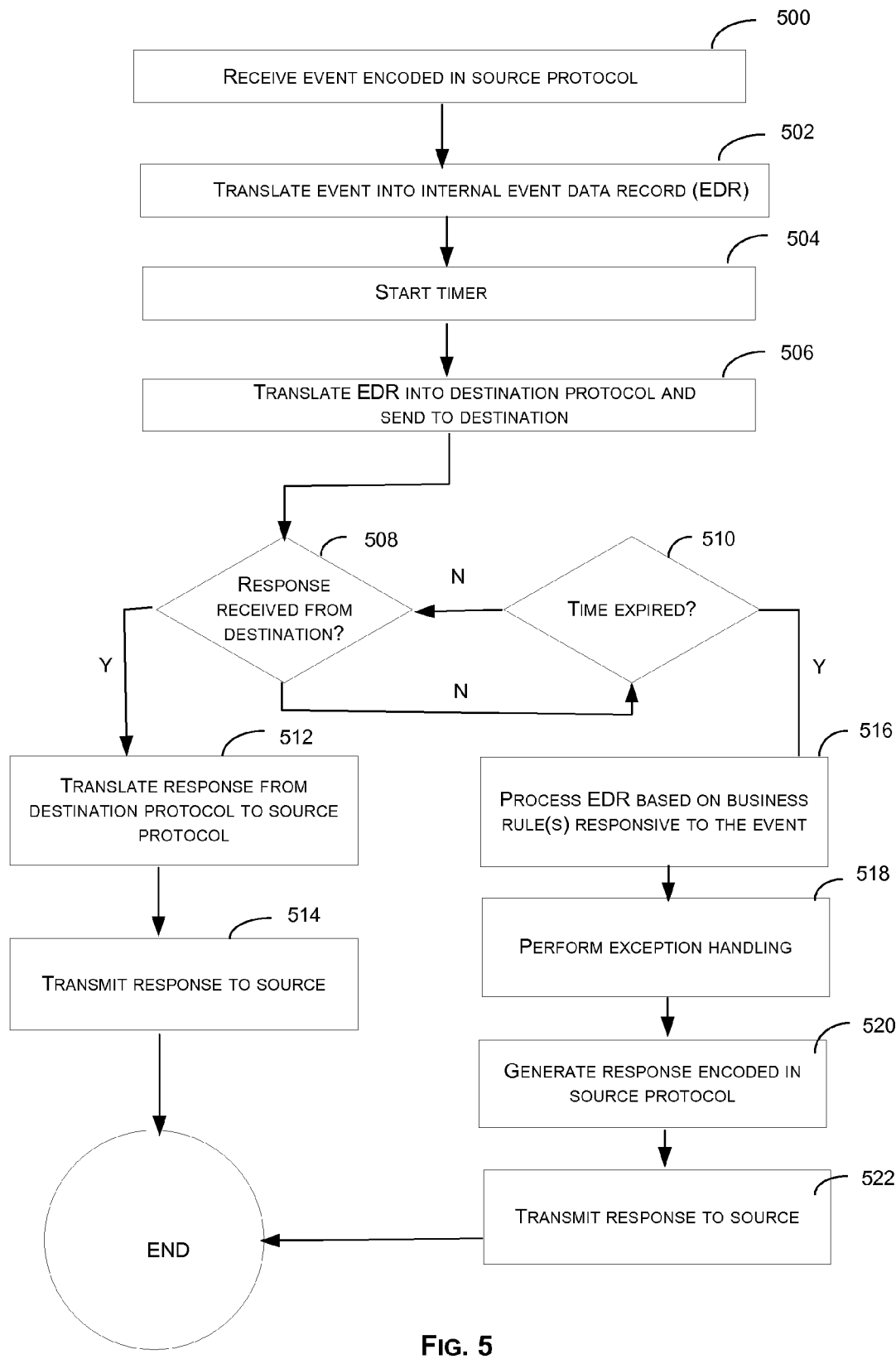
FIG. 5 is a flowchart illustrating the steps performed in processing an event in a gateway, in accordance with an embodiment of the present invention.

FIG. 5 is a flowchart illustrating a exemplary flow of an event in a gateway, in accordance with an embodiment of the present invention. This chart is a more abstract representation of the process depicted in FIG. 4, and illustrates that the same "time-out" functionality may be implemented in a gateway that does not utilize the same or similar functional pipelines. At step 500, the gateway receives an event encoded as a network message in the protocol language of the source network. In the context of a service provider's event processing system, this event may be, for example, an authorization, authentication, rating, or account update event. At step 502, the event is translated into an internal event data record, or EDR, so that it may be subsequently processed in the gateway without performing multiple, unnecessary translations. In an alternative embodiment, the incoming message may be directly translated into the protocol language of the destination network.

Once the message has been translated, a timer is started at step 504, and the EDR is translated and sent to the destination network at step 506.

At states 508 and 510, the process operates in a loop until either a response is received from the destination network, or the timer has reached its threshold. As mentioned previously, the threshold is configurable. In some embodiments, the threshold value may be responsive to the event that is being processed. For example, the acceptable latency for an authorization request may be configured to be lower than the acceptable latency of an account balance inquiry request. In other embodiments, the threshold value may be the same for all types of events.

If a response is received before time expires, the response is translated from the destination to the source protocol at step 512 and transmitted to the source network at step 514. If a response is not received before time expires, the event is locally handled by the gateway. First, the EDR is processed based on one or more business rules responsive to the corresponding business event (step 516). Second, the EDR is optionally stored to a local or networked storage device as part of an exception handling routine (step 518). Third, a response is generated and translated into the protocol language of the source network (step 520). And finally, the response is transmitted to the source network (step 522).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for interfacing a first network using a first protocol with a second network using a second protocol, comprising:

receiving, by a device, an event in the form of a first message from the first network, wherein the first message is encoded using the first protocol;

translating, by the device, the first message into a second message, wherein the second message is encoded using the second protocol;

transmitting, by the device, the second message to the second network;

if a response to the second message is received from the second network within a configurable interval, transmitting, by the device, a third message to the first network, wherein the third message is based on the response to the second message received from the second network, and wherein the third message is encoded in the first protocol; and if a response to the second message is not received from the second network within a configurable interval:
processing, by the device, the event based on at least one rule that is responsive to the event; and
transmitting, by the device, a fourth message to the first network, wherein the fourth message is based on the processing of the event performed by the device, and wherein the fourth message is encoded in the first protocol.

2. The method of claim 1, further comprising maintaining at least two simultaneous connections to the second network.

3. The method of claim 2, further comprising determining which of the at least two simultaneous connections to use in transmitting the second message to the second network.

4. The method of claim 1, wherein the event is an authentication event.

5. The method of claim 1, wherein the event is an authorization event.

6. The method of claim 1, wherein the event is a rating event.

7. The method of claim 1, wherein the event is an account balance update event.

8. A non-transitory machine-readable medium having stored thereon a series of instructions which, when executed by a processor, cause the processor to interface a first network using a first protocol with a second network using a second protocol by:
receiving an event in the form of a first message from the first network, wherein the first message is encoded using the first protocol;
translating the first message into a second message, wherein the second message is encoded using the second protocol;
transmitting the second message to the second network;
if a response to the second message is received from the second network within a configurable interval, transmitting a third message to the first network, wherein the third message is based on the response to the second message received from the second network, and wherein the third message is encoded in the first protocol; and
if a response to the second message is not received from the second network within a configurable interval:
processing the event based on at least one rule that is responsive to the event; and
transmitting a fourth message to the first network, wherein the fourth message is based on the processing of the event performed by the processor, and wherein the fourth message is encoded in the first protocol.

9. The non-transitory machine-readable medium of claim 8, further comprising instructions which, when executed by the processor, cause the processor to maintain at least two simultaneous connections to the second network.

10. The non-transitory machine-readable medium of claim 9, further comprising instructions which, when executed by the processor, cause the processor to determine which of the at least two simultaneous connections to use in transmitting the second message to the second network.

11. The non-transitory machine-readable medium of claim 8, further comprising instructions which, when executed by the processor, enable translation of a third protocol.

12. The non-transitory machine-readable medium of claim 8, wherein the event is an authentication event.

13. The non-transitory machine-readable medium of claim 8, wherein the event is an authorization event.

14. The non-transitory machine-readable medium of claim 8, wherein the event is a rating event.

15. The non-transitory machine-readable medium of claim 8, wherein the event is an account balance update event.

16. An apparatus that interfaces a first network using a first protocol with a second network using a second protocol, comprising:
one or more communication interfaces;
one or more storage devices; and
one or more processors in communication with the one or more communication interfaces and the one or more storage devices, the processor being configured to:
receive an event in the form of a first message from the first network, wherein the first message is encoded using the first protocol;
translate the first message into a second message, wherein the second message is encoded using the second protocol;
transmit the second message to the second network;
if a response to the second message is received from the second network within a configurable interval, transmit a third message to the first network, wherein the third message is based on the response to the second message received from the second network, and wherein the third message is encoded in the first protocol; and
if a response to the second message is not received from the second network within a configurable interval:
process the event based on at least one rule that is responsive to the event; and
transmit a fourth message to the first network, wherein the fourth message is based on the processing of the event performed by the processor, and wherein the fourth message is encoded in the first protocol.

17. The apparatus of claim 16, wherein at least two of the communications interfaces are in simultaneous communication with the second network.

18. The apparatus of claim 17, wherein the processor is further configured to determine which of the at least two communication interfaces in simultaneous connection with the second network to use in transmitting the second message to the second network.

19. The apparatus of claim 16, further comprising logic stored on the one or more storage devices that allows translation of a third protocol.

20. The apparatus of claim 16, wherein the event is an authentication event.

21. The apparatus of claim 16, wherein the event is an authorization event.

22. The apparatus of claim 16, wherein the event is a rating event.

23. The apparatus of claim 16, wherein the event is an account balance update event.

* * * * *

UNITED STATES PATENT AND TRADEMARK OFFICE
CERTIFICATE OF CORRECTION

| | | |
|---|---|---|
| PATENT NO. | : 8,223,777 B2 | Page 1 of 1 |
| APPLICATION NO. | : 11/559969 | |
| DATED | : July 17, 2012 | |
| INVENTOR(S) | : Krishnamoorthy et al. | |

It is certified that error appears in the above-identified patent and that said Letters Patent is hereby corrected as shown below:

On front page, in column 2, under "Other Publications", line 2-3, after "pp. 3." delete "Notice of Allowance for U.S. Appl. No. 09/562,875 mailed on May 21, 2007; pp. 7." and insert the same as a new entry.

On front page, in column 2, under "Other Publications", line 2, delete "09/562,875" and insert -- 09/562,785 --, therefor.

On front page, in column 2, under "Other Publications", line 4, delete "09/562,875" and insert -- 09/562,785 --, therefor.

On page 3, in column 2, under "Other Publications", line 1, delete "09/562,875," and insert -- 09/562,785, --, therefor.

On page 3, in column 2, under "Other Publications", line 3, delete "09/562,875," and insert -- 09/562,785, --, therefor.

On page 3, in column 2, under "Other Publications", line 5, delete "09/562,875," and insert -- 09/562,785, --, therefor.

In the specification, in column 5, line 62, delete "user-connected" and insert -- user connected --, therefor.

Signed and Sealed this
Twenty-third Day of October, 2012

David J. Kappos
*Director of the United States Patent and Trademark Office*